(12) United States Patent
Mllani

(10) Patent No.: US 7,492,890 B2
(45) Date of Patent: Feb. 17, 2009

(54) INTEGRATED CORDED SYSTEM CONNECTOR FOR A WIRELESS COMMUNICATIONS DEVICE

(75) Inventor: Neil Mllani, Raleigh, NC (US)

(73) Assignee: Sony Ericsson Mobile Communications AB, Lund (SE)

(*) Notice: Subject to any disclaimer, the term of this patent is extended or adjusted under 35 U.S.C. 154(b) by 916 days.

(21) Appl. No.: 10/696,954

(22) Filed: Oct. 29, 2003

(65) Prior Publication Data

US 2005/0094841 A1    May 5, 2005

(51) Int. Cl.
*H04M 1/00* (2006.01)
*H04M 9/00* (2006.01)

(52) U.S. Cl. .................. 379/420.04; 379/441; 439/505

(58) Field of Classification Search ................................
379/420.01–420.04, 438, 441; 455/556.1,
455/556.2, 557, 569.1, 74; 439/502, 505,
439/638
See application file for complete search history.

(56) References Cited

U.S. PATENT DOCUMENTS

| | | | |
|---|---|---|---|
| 5,573,425 A * | 11/1996 | Morisawa et al. | 439/502 |
| 5,640,444 A | 6/1997 | O'Sullivan | |
| 5,903,850 A * | 5/1999 | Huttunen et al. | 455/557 |
| 5,978,689 A * | 11/1999 | Tuoriniemi et al. | 455/569.1 |
| 6,058,319 A * | 5/2000 | Sadler | 455/569.2 |
| 6,101,403 A * | 8/2000 | Masuda | 455/569.2 |
| 6,625,472 B1 | 9/2003 | Sneed et al. | |
| 6,626,703 B2 * | 9/2003 | Hsin | 439/638 |
| 7,079,026 B2 * | 7/2006 | Smith | 340/539.22 |
| 2005/0215111 A1 * | 9/2005 | Weikel et al. | 439/502 |

FOREIGN PATENT DOCUMENTS

| | | |
|---|---|---|
| EP | 0464011 | 1/1992 |
| EP | 1315361 | 5/2003 |

OTHER PUBLICATIONS

"Integral." Roget's II: The New Thesaurus, Third Edition. Houghton Mifflin Company, 1995. Answers.com Aug. 4, 2008. http://www.answers.com/topic/integral.*
Author Unknown. "Albrecht Bedienungsanleitung/Anschlusshinweise Motorrad-Kommunikationsanlage AE 500." Feb. 2003, Alan Electronics GmbH.
European Patent Office. "Communication Pursuant to Article 94(3) EPC." Oct. 22, 2008.

* cited by examiner

*Primary Examiner*—Curtis Kuntz
*Assistant Examiner*—Phylesha Dabney
(74) *Attorney, Agent, or Firm*—Coats & Bennett, P.L.L.C.

(57) ABSTRACT

An accessory for a wireless communications device includes a cord that electrically connects a first peripheral device and a system plug. The system plug mates with a system connector on the wireless communications device, and electrically connects the first peripheral device to the wireless communications device. An auxiliary system connector integrally formed with the cord permits the connection of a second accessory to the wireless communications device.

21 Claims, 3 Drawing Sheets

INTEGRATED CORDED SYSTEM CONNECTOR FOR A WIRELESS COMMUNICATIONS DEVICE

BACKGROUND

The present invention relates generally to peripheral devices, and in particular, to peripheral devices for wireless communications devices.

Consumers have come to demand more functionality from their wireless communications devices than just simple two-way communications ability. Indeed, an entire market has evolved around the manufacture and sale of various accessories for wireless communications devices. For example, consumers can now purchase accessories such as battery chargers, hands-fee headsets, MP3 players, external cameras and flashes, and cables that permit users to upload/download data to/from the wireless communications device.

Some accessories have a cord with a plug on one end that mates with a system connector on the wireless communications device. When the user wishes to use the particular accessory, he or she simply plugs the accessory into the system connector. In many prior art devices, a problem arises when a user desires to use one or more accessories simultaneously. Some accessories use the entire system connector thereby preventing the use of a second accessory at the same time. Thus, users are often faced with the dilemma of either listening to an external MP3 player, for example, or conversing with a remote party using a hands-free headset. Further, the many cords may become tangled. What is needed is a device that permits users to use more than one accessory with their wireless communications device, as well as a way to eliminate the need to have a plurality of cords.

SUMMARY

An accessory for a wireless communications device comprises a first peripheral device, a system plug that mates with a system connector on the wireless communications device, and a cord electrically connecting the first peripheral device with the system plug. An auxiliary system connector integrally formed with the cord provides a connection for a second peripheral device without the need to remove the first peripheral device from the system connector.

DETAILED DESCRIPTION

Figure 1:
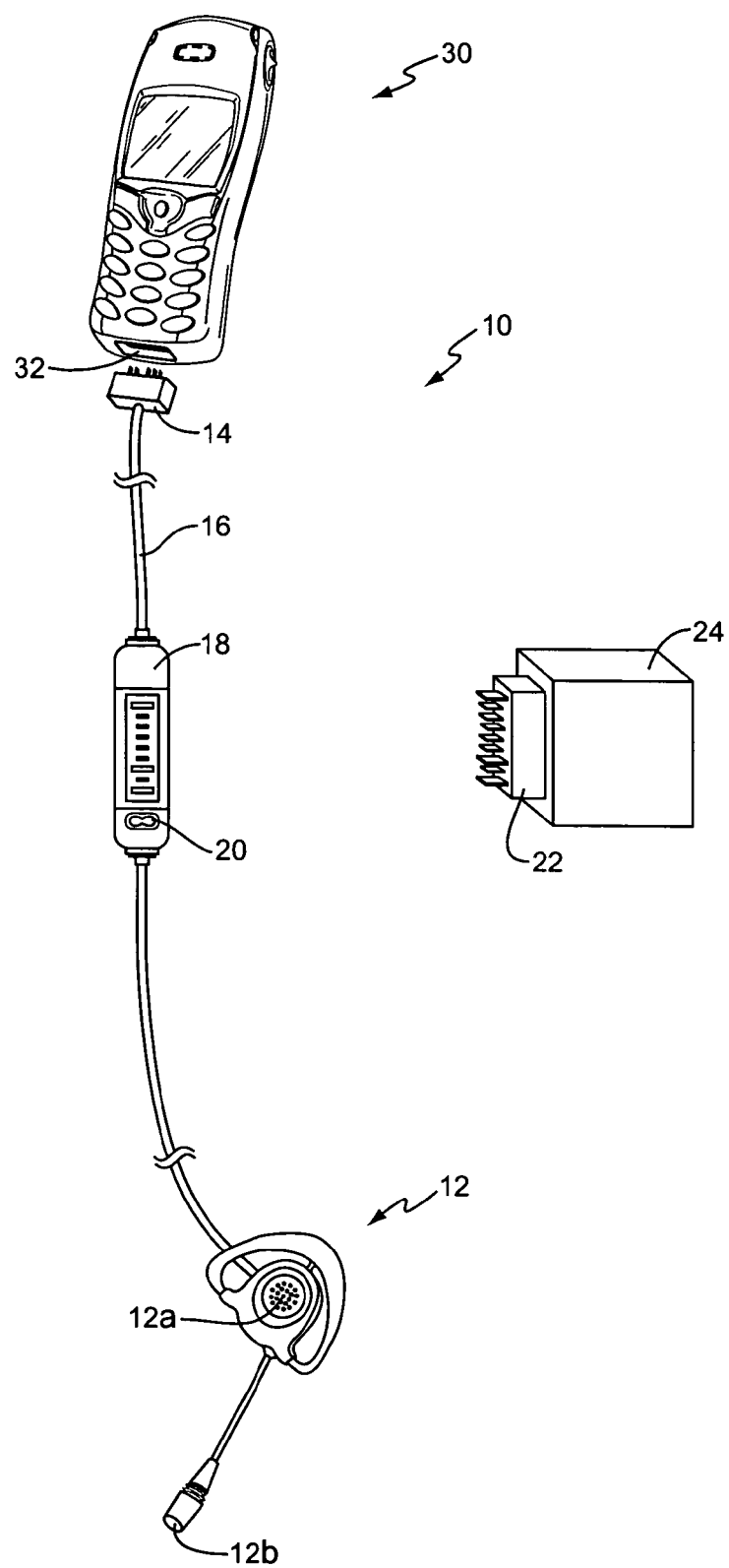
FIG. 1 illustrates one embodiment of the present invention.

Referring now to FIG. 1, one embodiment of the present invention is shown therein and generally referenced by the number 10. The embodiment of FIG. 1 illustrates a corded accessory with an integrated system corded connector. The corded accessory 10 comprises a first peripheral device 12, a system plug 14, a cord 16 interconnecting first peripheral device 12 and system plug 14, and an auxiliary system connector 18. The auxiliary system connector 18 is integrally formed with cord 16, and as described later in more detail, permits the connection of a second peripheral device 24. A switch 20 on the housing of the auxiliary system connector 18 allows a user of the corded accessory 10 to switch between first peripheral device 12 and second peripheral device 24.

As seen in FIG. 1, first peripheral device 12 may comprise a hands-free headset that includes a speaker 12a and a microphone 12b. However, those skilled in the art will readily appreciate that the depiction of first peripheral device 12 in FIG. 1 as a hands-free headset is merely illustrative. First peripheral device 12 may also be some other accessory, such as a battery charger or an MP3 player, or it may be a separate device such as a Personal Digital Assistant (PDA) or a personal computing device.

The system plug 14 mates with the system interface connector 32 of wireless communications device 30. Typically, system plug 14 is a "male" type connector that plugs into a corresponding "female" type system interface connector 32. However, alternate embodiments contemplate system plug 14 as a "female" type connector that plugs into a corresponding "male" type system interface connector 32.

Cord 16 interconnects first peripheral device 12 and system plug 14. Typically, cord 16 contains one or more electrical conductors, such as copper wires that serve as an electrical pathway between first peripheral device 12 and wireless communications device 30. Cord 16 preferably includes an outer sheath to insulate and protect the electrical conductors contained within the sheath.

The auxiliary system connector 18 is integrated into the cord 16, and mates with a system plug 22 of second peripheral device 24. As seen in the Figures, auxiliary system connector 16 may be enclosed inside a molded protective housing made of plastic or some other suitable material. The electrical conductors that interconnect first peripheral device 12 to system plug 14 also interconnect auxiliary system connector 18 to system plug 14. This provides an electrical pathway between auxiliary system connector 18 and wireless communications device 30, thereby permitting the user electrically connect the second peripheral device 24 to the wireless communications device without first having to remove or unplug first peripheral device 12 from system interface connector 32.

In use, the user connects the system plug 14 of corded accessory 10 to the system interface connector 32 of wireless communications device 30. This makes an electrical connection between the wireless communications device 30 and first peripheral device 12. In this example, first peripheral device 12 is a hands-free headset, which allows the user to pursue other activities, such as driving a car, while engaging in a conversation with a remote party. However, the user may also wish to listen to music stored in an MP3 player, exemplified in FIG. 1 by second peripheral device 24, when the user is not engaged in conversation. Thus, the user simply connects system plug 22 of second peripheral device 24 into auxiliary system connector 18 to establish a second electrical connection between the second peripheral device 24 and the wireless communications device 30. The user may now engage in a conversation with a remote party and/or listen to music without having to connect and disconnect first peripheral device 12 and second peripheral device 24 from system interface connector 32.

First peripheral device 12 and second peripheral device 24 may or may not share some common signals sent to/received from wireless communications device 30. For example, first peripheral device 12 and second peripheral device 24 may receive audio on the same audio-out line from wireless communications device 30. A similar circumstance may occur for power and audio-in lines. Likewise, other signals may or may not be shared. In these embodiments, switch 20 permits a user to selectively switch signal paths between first peripheral device 12 and second peripheral device 24.

Switch 20 may comprise, but is not limited to, optical switches, electrical switches, mechanical switches, or multi-way switches, for example. One embodiment of the present invention includes a 2-way mechanical rocker switch that permits the user to selectively alternate audio between first peripheral device 12 and second peripheral device 24. Thus, the user can operate switch 20 to ensure that only one of the first and second peripheral devices 12, 24 receive audio on the audio-out line, send audio on the audio-in line, or receive power from the wireless communications device 30. Alternatively, switch 20 may also be configured to allow both first and second peripheral devices 12, 24 to send and/or receive audio, as well as power.

In another embodiment of the present invention, switch 20 may include circuitry to automatically detect the presence (or lack of presence) of one or more peripheral devices connected to auxiliary system connector 18. The circuitry may be positioned in the auxiliary system connector 18, for example. The circuitry could automatically detect the type of peripheral device or devices connected to the auxiliary system connector 18, and control the transmission paths of the signals to/from first and second peripheral devices 12, 24 based on the type of peripherals it detects. An alternate embodiment utilizes a microprocessor or other circuitry within the wireless communications device 30 to automatically detect the type of peripheral device or devices connected to the auxiliary system connector 18. In this embodiment, the microprocessor sends control signals to the auxiliary system connector 18 to control the switch configuration. For example, a user listening to an MP3 player may want to be interrupted to receive an incoming call. In these cases, the microprocessor would automatically switch the audio-out path from the MP3 player to the wireless communications device 30. The user can then communicate using a hands-free headset.

Those skilled in the art will realize that the functionality to distinguish between accessories and control the signaling paths accordingly may conceivably be encompassed in software programming and/or hardware. Of course, switch 20 may not be included at all. Further, the specifics of switch 20 and its operation will invariably depend upon; inter alia, factors such as connector configuration and available functionality.

Figure 2:
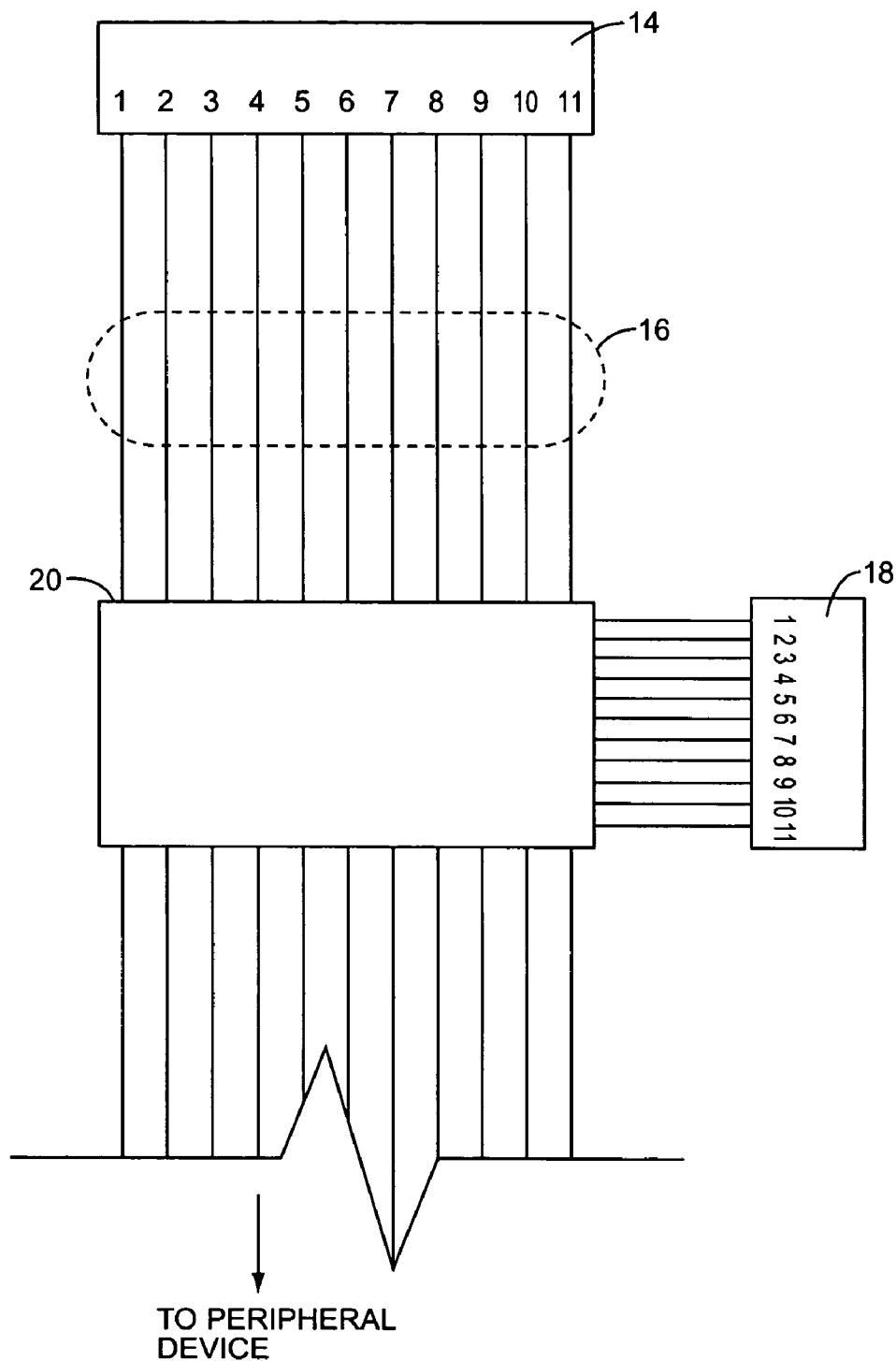
FIG. 2 illustrates a possible pin-out diagram for one embodiment of the present invention.

Auxiliary connector 18 may be wired to system plug 14 in any number of ways. For example, the wiring may be straight through, or may be more complex, depending on how the systems interface connector 32 and/or the auxiliary connector 18 is configured. In FIG. 2, for example, the pins on system plug 14 are wired through switch 20 to auxiliary connector 18 and first peripheral device 12. As stated above, switch 20 may comprise circuitry to automatically detect signals along the wires, or may be circuitry that is controlled by the microprocessor within the wireless communications device 30. Other configurations are also possible. While this illustrates a simplistic embodiment, those skilled in the art will understand that a virtually limitless number of ways exist in which to wire the connections between system plug 14 and auxiliary system connector 18.

Figure 3:
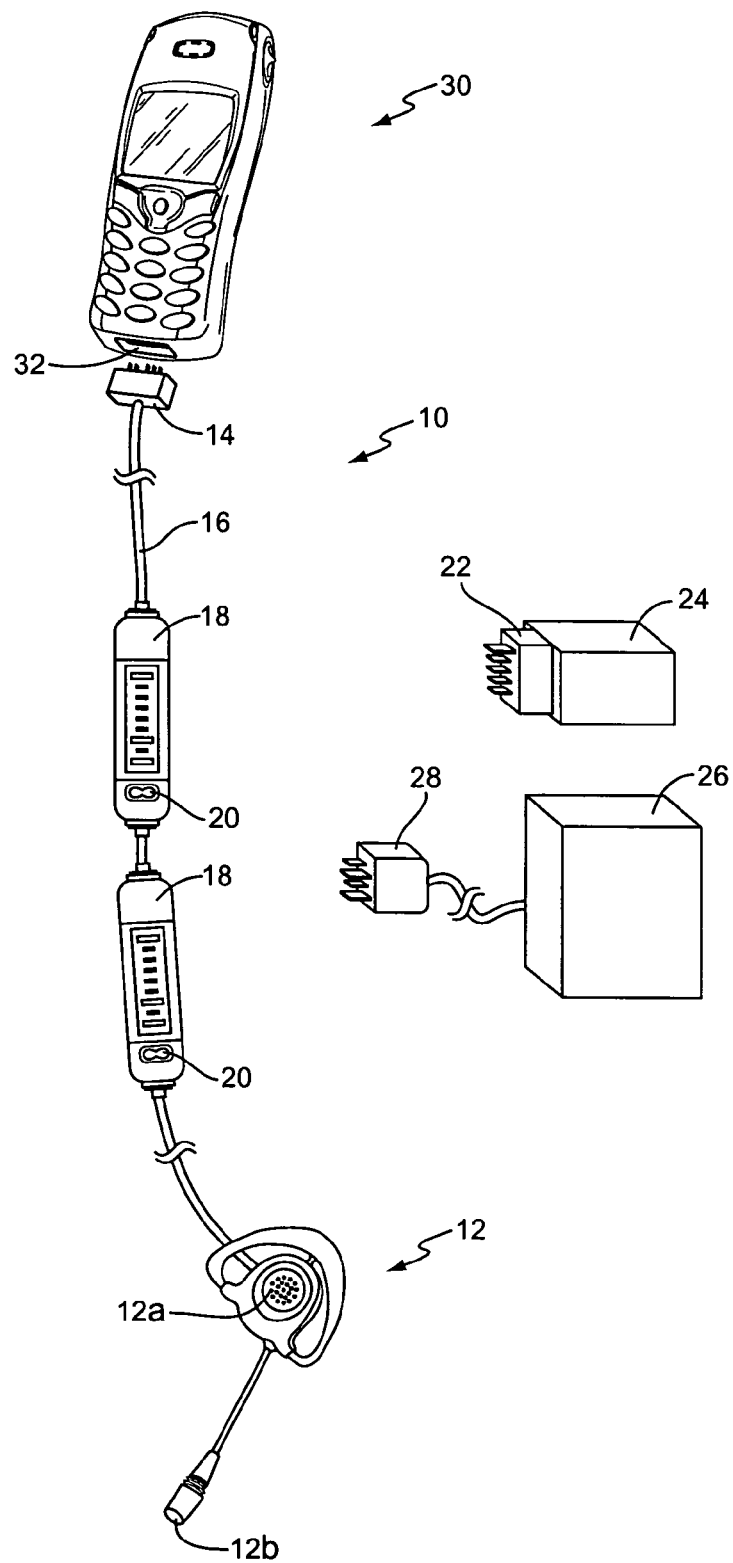
FIG. 3 illustrates an alternate embodiment of the present invention.

The number of accessories that may be connected in the present invention is limited only by the number of available pins in auxiliary system connector 18. For example, FIG. 3 illustrates one embodiment where system plug 22 of second peripheral device 24 all the pins that are available in auxiliary system connector 18. Thus, a third peripheral device 26 having a system plug 28 may be connected simultaneously with second peripheral device 24 to the same auxiliary system connector 18. Additionally, corded accessory 10 may include a plurality of auxiliary system connectors 18 integrally formed with cord 16. Each auxiliary system connector 18 may permit the connection of one or more peripheral devices.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

The invention claimed is:

1. An accessory for a wireless communications device comprising:
   a first peripheral accessory device; a system plug that mates with a system connector on the wireless communications device;
   a cord electrically connecting the first peripheral accessory device with the system plug;
   an auxiliary system connector configured to connect a second peripheral accessory device to the wireless communications device, said auxiliary system connector positioned along the cord between the system plug and the first peripheral device, and joined together with the cord as a single unit in a substantially permanent manner; and
   a switch disposed on the auxiliary system connector, and configured to selectively connect the first and second peripheral devices to the wireless communications device.

2. The accessory of claim 1 wherein the switch connects the wireless communications device to the first peripheral device via a first audio-in path in a first position, and to the second peripheral device via a second audio-in path in a second position.

3. The accessory of claim 1 wherein the switch connects the wireless communications device to the first peripheral device via a first audio-out path in a first position, and to the second peripheral device via a second audio-out path in a second position.

4. The accessory of claim 1 wherein the switch connects the first peripheral device to the wireless communications device via a first path in a first position, and to the second peripheral device via a second path in a second position.

5. The accessory of claim 1 wherein the switch comprises circuitry to automatically detect the type of peripheral device connected to the auxiliary system connector.

6. The accessory of claim 1 wherein the auxiliary system connector further connects a third peripheral device.

7. The accessory of claim 1 wherein one of the first and second peripheral devices is a hands-free headset.

8. The accessory of claim 1 wherein one of the first and second peripheral devices is a battery charger.

9. The accessory of claim 1 wherein one of the first and second peripheral devices is a MP3 player.

10. The accessory of claim 1 wherein one of the first and second peripheral devices is a camera.

11. The accessory of claim 1 wherein one of the first and second peripheral devices is a flash accessory.

12. The accessory of claim 1 further comprising a second auxiliary system connector integrally formed with the cord.

13. A method of connecting accessories to a wireless communications device comprising:
   connecting a first peripheral accessory device to a system connector on the wireless communications device, the first peripheral accessory device comprising a cord that interconnects the first peripheral accessory device and a system plug;
   connecting a second peripheral accessory device to an auxiliary system plug positioned along the cord between the system plug and the first peripheral device, and joined together with the cord as a single unit in a substantially permanent manner; and selectively switching between one or more signal paths that extend between the first and second peripheral accessory devices and the wireless communications device to selectively connect the first and second peripheral accessory devices to the wireless communications device.

14. The method of claim 13 wherein connecting a first peripheral accessory device comprises mating the system plug on the first peripheral accessory device with a system connector on the wireless communications device.

15. The method of claim 13 wherein connecting a second peripheral accessory device comprises mating a system plug on the second peripheral accessory device with the auxiliary system plug.

16. The method of claim 13 further comprising connecting a third peripheral accessory device to the auxiliary system plug by mating a system plug on the third peripheral accessory device with the auxiliary system plug.

17. The method of claim 13 wherein selectively switching between one or more signal paths comprises switching a source of audio into the wireless communications device from the first peripheral accessory device to the second peripheral accessory device.

18. The method of claim 13 wherein selectively switching between one or more signal paths comprises switching a source of audio out of the wireless communications device into the second peripheral accessory device from the first peripheral accessory device.

19. The method of claim 13 wherein selectively switching between one or more signal paths comprises switching a source of audio into the peripheral accessory device into the wireless communications device to the second peripheral accessory device.

20. The method of claim 13 further comprising automatically detecting the type of peripheral accessory device connected to the auxiliary system plug.

21. The method of claim 20 further comprising controlling signals communicated between the wireless communications device and the first or second peripheral accessory devices responsive to the detected peripheral accessory device type.

* * * * *

UNITED STATES PATENT AND TRADEMARK OFFICE
CERTIFICATE OF CORRECTION

| | |
|---|---|
| PATENT NO. | : 7,492,890 B2 |
| APPLICATION NO. | : 10/696954 |
| DATED | : February 17, 2009 |
| INVENTOR(S) | : Milani |

Page 1 of 1

It is certified that error appears in the above-identified patent and that said Letters Patent is hereby corrected as shown below:

Correct spelling of Inventor's last name to -- Milani --

Change col. 6, line 11, to read: -- source of audio into the first peripheral accessory device from the --

Signed and Sealed this

Twenty-first Day of July, 2009

JOHN DOLL
*Acting Director of the United States Patent and Trademark Office*